(12) United States Patent
Duan et al.

(10) Patent No.: US 11,709,109 B2
(45) Date of Patent: Jul. 25, 2023

(54) PCB WIND TUNNEL TEST EQUIPMENT

(71) Applicants: Inventec (Pudong) Technology Corporation, Shanghai (CN); INVENTEC CORPORATION, Taipei (TW)

(72) Inventors: Hangyu Duan, Shanghai (CN); Lianfei Zhang, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 85 days.

(21) Appl. No.: 17/356,520

(22) Filed: Jun. 24, 2021

(65) Prior Publication Data

US 2022/0291081 A1   Sep. 15, 2022

(30) Foreign Application Priority Data

Mar. 11, 2021   (CN) .......................... 202110266939.2

(51) Int. Cl.
*G01M 9/04*   (2006.01)

(52) U.S. Cl.
CPC ..................................... *G01M 9/04* (2013.01)

(58) Field of Classification Search
None
See application file for complete search history.

(56) References Cited

FOREIGN PATENT DOCUMENTS

CN         108007665 A   *   5/2018   ..............  G01M 9/04

\* cited by examiner

*Primary Examiner* — Andre J Allen
*Assistant Examiner* — Jermaine L Jenkins

(57) ABSTRACT

The PCB wind tunnel test device includes: a flow-stabilizing structure, which includes: a box used to provide flow channels for air entering the flow-stabilizing structure; flow-stabilizing plates, which are inserted into the cavities of the box in a layered manner; a wind source, arranged at an air inlet of the flow-stabilizing structure; a test device, arranged at the outlet of the flow-stabilizing structure. When the flow-stabilizing structure receives the wind energy provided by the wind source, the state of the air flow is adjusted by flow stabilization, so that the test device tests the air passing through the flow-stabilizing structure. The present invention solves the problem that conventional wind tunnels cannot test at low air volumes and enables PCB testing at different ambient temperatures.

11 Claims, 3 Drawing Sheets

PCB WIND TUNNEL TEST EQUIPMENT

CROSS REFERENCE TO RELATED APPLICATION

The present application claims the benefit of priority to Chinese Patent Application No. CN 2021102669392, entitled "PCB WIND TUNNEL TEST EQUIPMENT", filed with CNIPA on Mar. 11, 2021, the disclosure of which is incorporated herein by reference in its entirety.

FIELD OF TECHNOLOGY

The present disclosure generally relates to wind tunnel equipment, and in particular, to PCB wind tunnel test equipment.

BACKGROUND

The wind tunnel equipment conventionally used for server testing has an air volume between 3.8 CFM and 800 CFM. Its accuracy is poor under low air volume and cannot be used for tests of small boards which require low air volume (1 CFM~15 CFM). In addition, the conventional wind tunnel equipment is too large to be placed in a thermostat, and can only be used to test system impedance and fan air volume, and cannot be used for tests regarding heat dissipation conditions at different ambient temperatures and printed circuit board (PCB) tests usually include heat dissipation tests at different ambient temperatures while measuring the air volume.

However, it is relatively expensive to purchase wind tunnel equipment whose air volume is suitable for the PCB tests and can be easily put into the incubator. One piece of wind tunnel equipment costs about 50,000 US dollars, and the procurement and installation time is also relatively long.

SUMMARY

The present disclosure provides a PCB wind tunnel test equipment. The PCB wind tunnel test device includes: a flow-stabilizing structure, which includes: a box used to provide flow channels for air entering the flow-stabilizing structure; flow-stabilizing plates, which are inserted into the cavities of the box in a layered manner; a wind source, arranged at an air inlet of the flow-stabilizing structure; a test device, arranged at the air outlet of the flow-stabilizing structure. When the flow-stabilizing structure receives the wind energy provided by the wind source, the state of the air flow is adjusted by flow stabilization, so that the test device can test the air passing through the flow-stabilizing structure.

The PCB wind tunnel test equipment of the present disclosure has the following beneficial effects:

First, the present disclosure solves the problem that conventional wind tunnels cannot test at low air volumes, it can provide air volumes within the range of 1-20 CFM, and it can also adjust the air volume range according to different needs.

Second, the PCB wind tunnel test equipment of the present disclosure is light and easy to transport, and can be placed in a thermostat for testing, which enables PCB testing at different ambient temperatures.

Third, the PCB wind tunnel test equipment of the present disclosure is convenient to manufacture and has low manufacturing cost. In some embodiment, the cost of making a piece of the equipment is less than RMB 500.

DETAILED DESCRIPTION

One or more specific embodiments of the present disclosure will be described below. These described embodiments are only examples of the presently disclosed techniques, and are not intended to limit aspects of the presently disclosed invention. Additionally, in an effort to provide a concise description of these embodiments, all features of an actual implementation may not be described in the specification. It should be appreciated that in the development of any such actual implementation, numerous implementation-specific decisions must be made to achieve the developers' specific goals, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terms regarding spatial relationships such as "lower," "below," "under," and "on," "above," etc., are used for convenience of description to describe the relationship of one element or feature to another element or feature in a figure. It should be understood that in addition to the orientation shown in the figure, the spatial relationship terms are intended to include different orientations during use and operation. For example, if the device in the figures is rotated, then what is described as "below" or "beneath" or "under" may become "on" or "above" or "over." Thus, the term "below" and "under" may include both upper and lower orientations. Device may additionally be oriented differently (e.g., rotated 90 degrees or other orientations), and the spatial relationship used in this description are interpreted accordingly.

The present disclosure provides PCB (printed circuit board) wind tunnel test equipment, including:

a flow-stabilizing structure, including: a box used to provide a flow channel for air entering the flow-stabilizing structure; flow-stabilizing plates inserted into cavities of the box in a layered manner; a wind source arranged at an air inlet of the flow-stabilizing structure; and a test device arranged at the air outlet of the flow-stabilizing structure.

When the flow-stabilizing structure receives the wind energy provided by the wind source, the air provided by the wind source is stabilized, so that the testing device can test the air passing through the flow-stabilizing structure.

Figure 1:
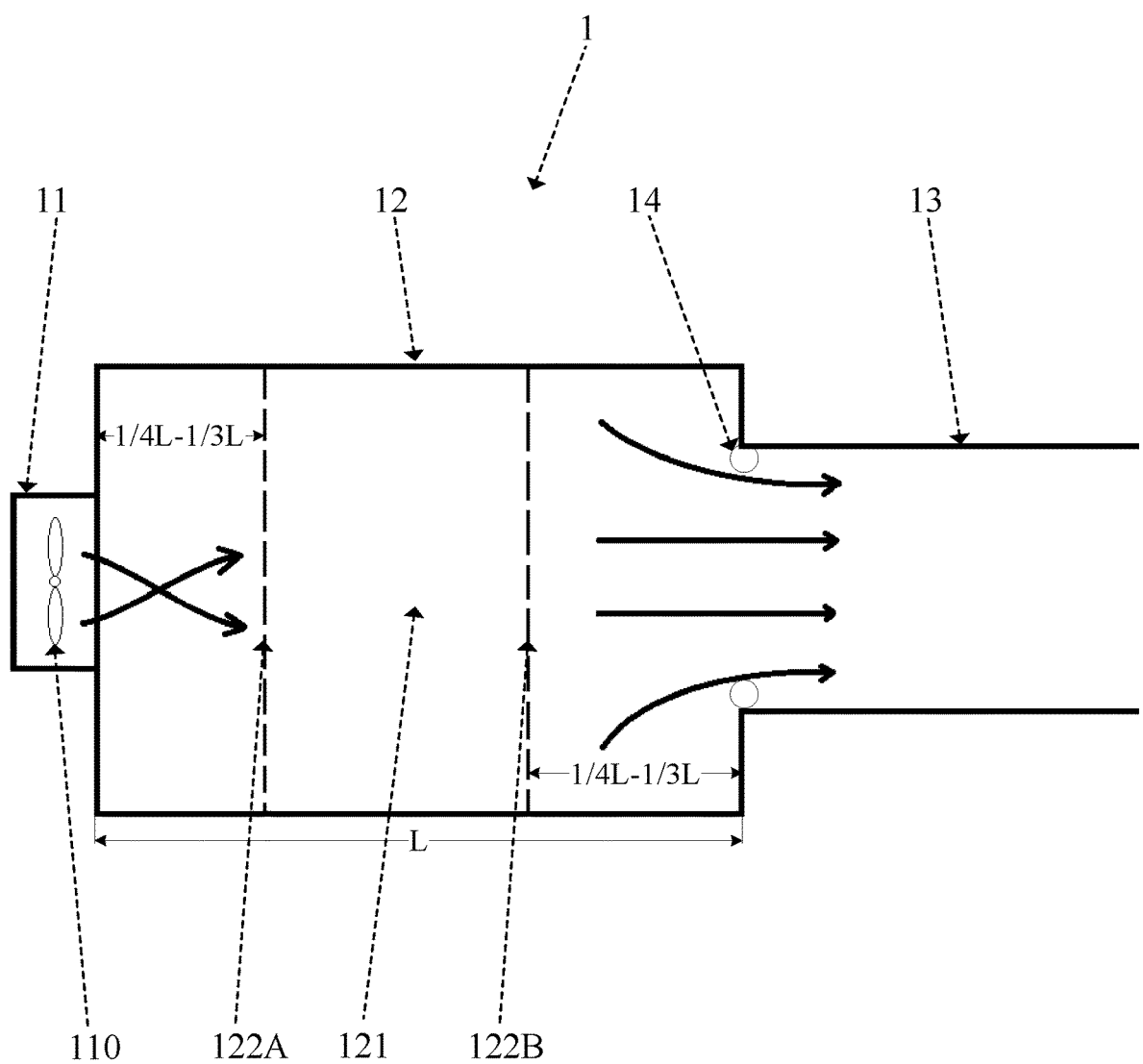
FIG. 1 shows a schematic structural diagram of PCB wind tunnel test equipment according to an embodiment of the present disclosure.

Referring to FIG. 1, which shows a schematic structural diagram of the PCB wind tunnel test equipment according to an embodiment of the present disclosure, the PCB wind tunnel testing equipment 1 includes a wind source 11, a flow-stabilizing structure 12, a PCB wind tunnel 13 and a testing device 14.

The wind source 11 arranged at an air inlet of the flow-stabilizing structure 12 is the core of the equipment, and is used to provide a required air volume for the PCB wind tunnel testing equipment 1.

In one embodiment, the wind source includes: a fan (110); and a PWM (pulse width modulation) controller electrically connected to the fan (110) and used to adjust the rotation speed of the fan (110). In this embodiment, the rotation speed of the air source is required to be stable, and the air volume cannot fluctuate when the rotation speed stays the same.

Figure 2:
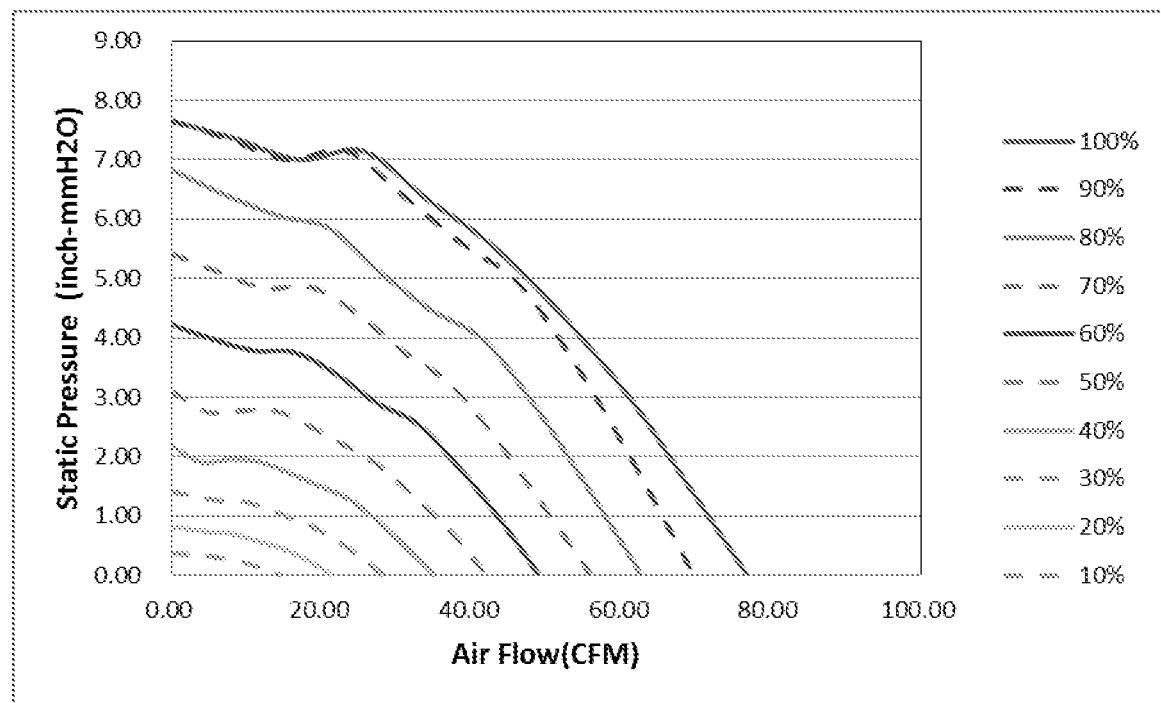
FIG. 2 shows P-Q curves corresponding to different duties of a fan according to an embodiment of the present disclosure.

Specifically, the fan is a 12V axial flow fan, with positive and negative power lines, and PWM signal lines. Among them, the positive and negative power lines are connected to a 12V power supply to supply power to the fan, and the PWM signal lines are connected to a PWM controller to adjust the fan speed. When the axial flow fan works, the fan blades rotate, pushing the air to move along the axis. FIG. 2 shows P-Q curves corresponding to different duties of the fan according to an embodiment of the present disclosure. P represents wind pressure, that is, force per unit area asserted on the fan by the wind. Q represents air volume, that is, volume of air passing through the fan in a unit time. Therefore, when the fan's duty and wind pressure are determined, the corresponding air volume can be obtained. The fan can maintain a stable rotation speed under different duties, and with a duty regulator, it can provide a stable wind source with 100 gears for testing.

The flow-stabilizing structure 12 arranged between the wind source 11 and the PCB wind tunnel 13 is used to adjust the state of the air provided by the wind source 11.

Figure 3A:
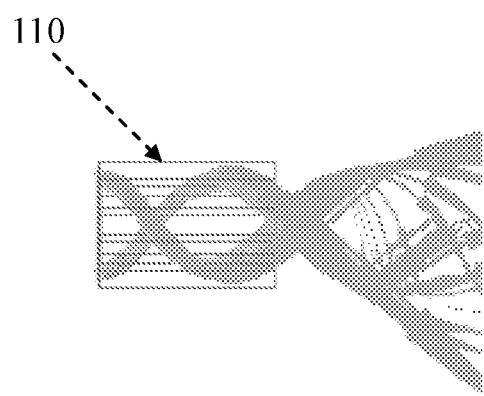
FIG. 3A illustrates air flowing out from a fan.

In this embodiment, after being disturbed by the blades of the fan, the air flows out of the fan in a spiral shape as shown in FIG. 3A, resulting in a large difference in wind speed measured at different locations. Therefore, as shown in FIG. 1, the flow-stabilizing structure includes a box 121 and flow-stabilizing plates. After the air enters the box, it is diffused, and then adjusted from a spiral state to a turbulent state through the flow-stabilizing plates, and finally shrunk into the PCB wind tunnel 13, so that the air can pass through the PCB in a stable manner.

The box 121 is used to provide a flow channel for the air entering the flow-stabilizing structure. In this embodiment, the box 121 is made of plastic or organic glass (for example, acrylic plates), which has the advantage of convenient shaping and will not be easily deformed by wind.

The flow-stabilizing plates are inserted into cavities of the box in a layered manner. In this embodiment, the flow-stabilizing plates include at least two layers of mesh plates.

Still referring to FIG. 1, the flow-stabilizing plates in this embodiment include a first mesh plate 122A and a second mesh plate 122B. The distance between the first layer of mesh plate 122A and an air inlet side of the box 121 is between ¼L and ⅓L; the distance between the second layer of mesh plate 122B and the air outlet side of the box 121 is between ¼L and ⅓L; L is the length of the box.

The first layer of mesh plate 122A is used to adjust the air from a spiral state to a turbulent state.

The second layer of mesh plate 122B arranged behind the first mesh plate 122A is used to adjust the air from a turbulent state to a uniform flow. Between 30% and 70% of the first layer of mesh plate and the second layer of mesh plate is occupied by holes, which can ensure a better adjustment effect.

Figure 3B:
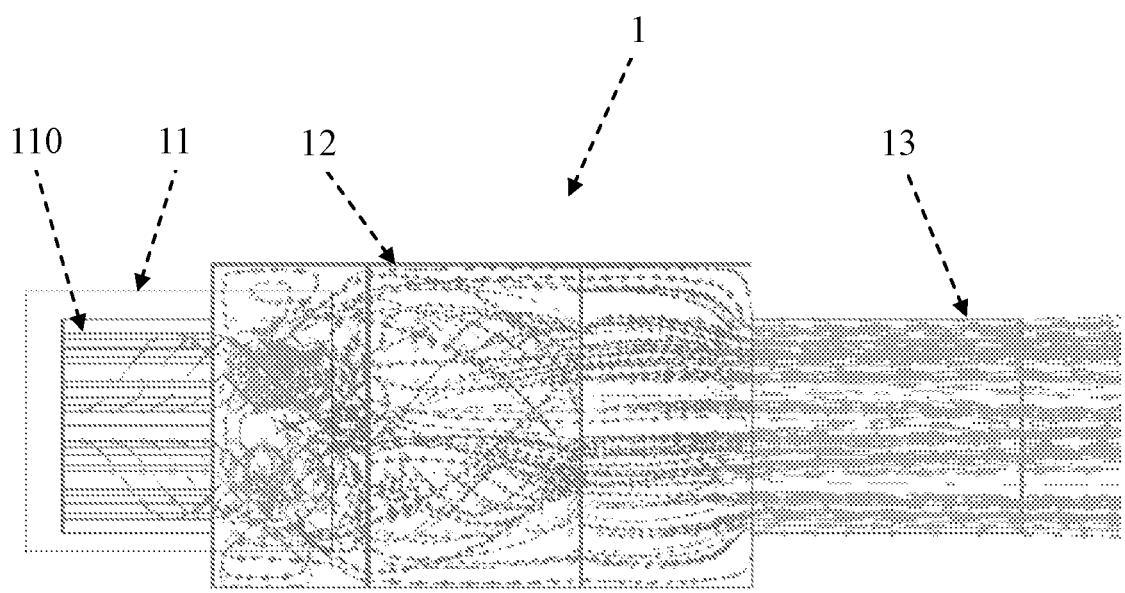
FIG. 3B shows a simulation result of air passing through a flow-stabilizing structure according to an embodiment of the present disclosure.

In this embodiment, the software Flotherm is used to simulate the air flow after the air passes through the box. The simulation result is shown in FIG. 3B. After the air passes through the first layer of mesh plate 122A, the flow is still somewhat turbulent. After it passes through the second layer of mesh 122B, the air flow becomes rather uniform.

The PCB wind tunnel 13 is detachably arranged at the air outlet of the flow-stabilizing structure 12, and is hermetically connected to the air outlet of the flow-stabilizing structure. The PCB wind tunnel 13, made of plastic or organic glass, is used to fix PCBs of different sizes (FHFL/HHFL/HHHL). In this embodiment, there is no need to remake the entire wind tunnel equipment.

Specifically, the size of an opening of the PCB wind tunnel 13 is smaller than the size of the air outlet of the flow stabilizing structure.

Still referring to FIG. 1, the testing device 14 is arranged at the air outlet of the flow-stabilizing structure 12.

When the flow-stabilizing structure receives the wind energy provided by the wind source, the flow state of the air is adjusted by stabilizing the flow, so that the testing device 14 tests the air passing through the flow-stabilizing structure 12.

Specifically, the testing device 14 includes a temperature sensor and a wind speed sensor arranged between the air outlet of the flow-stabilizing structure and the PCB wind tunnel. The temperature sensor is used to measure the temperature of the air passing through the PCB. The wind speed sensor is used to measure the wind speed of the air passing through the PCB.

The following is a test process applying the PCB wind tunnel test equipment described in this embodiment;

First, connecting the PCB wind tunnel test equipment of this embodiment to a conventional wind tunnel device;

Second, starting the PCB wind tunnel test equipment and adjust the fan to a fixed duty;

Then, starting the conventional wind tunnel equipment, running a test program, and reading the air volume under the 0 mm-H20 state, which is the fan air volume under the current duty.

Then, adjusting the fan duty, repeating the above air volume testing process, and measuring the corresponding fan air volume under each duty. The corresponding air volumes for several different duties of the fan are shown in Table 1.

TABLE 1

Air volumes corresponding to different duties of the fan

| Duty (%) | Air Volume (CFM) | Rotation Speed (RPM) |
| --- | --- | --- |
| 10 | 1.39 | 2616 |
| 15 | 2.11 | 3800 |
| 20 | 3.02 | 5057 |
| 25 | 3.81 | 6351 |
| 30 | 5 | 8199 |
| 35 | 6 | 9769 |
| 40 | 6.93 | 11008 |
| 45 | 7.76 | 12132 |
| 50 | 8.64 | 13130 |
| 55 | 9.57 | 14391 |
| 60 | 10.57 | 16037 |
| 65 | 11.53 | 17115 |
| 70 | 12.69 | 18711 |
| 75 | 13.82 | 20048 |
| 80 | 14.99 | 21592 |
| 85 | 16.03 | 23012 |
| 90 | 16.84 | 24126 |
| ... | ... | ... |

Finally, according to the test results, fitting the duty-volume curve, and obtaining a corresponding fitted equation.

According to the fitted equation, fan air volumes corresponding to a sequence of duties that increment by 1% can be calculated. It can be known from the above test results that in the present disclosure the fan speed can be increased or decreased to adjust the air volume simply by the PWM controller.

In some embodiments, the PCB wind tunnel testing equipment further comprises a processor connected to the pulse width modulation controller and the wind speed sensor for testing air volumes passing through the PCB at different rotation speeds.

In summary, the PCB wind tunnel test equipment of the present disclosure has the following beneficial effects:

First, the present disclosure solves the problem that conventional wind tunnels cannot test at low air volumes, it can provide air volumes within the range of 1-20 CFM, and it can also adjust the air volume range according to different needs.

Second, the PCB wind tunnel test equipment of the present disclosure is light and easy to transport, and can be placed in a thermostat for testing, which enables PCB testing at different ambient temperatures.

Third, the PCB wind tunnel test equipment of the present disclosure is convenient to manufacture and has low manufacturing cost. In some embodiment, the cost of making a piece of the equipment is less than RMB 500.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. PCB wind tunnel test equipment, comprising:
    a flow-stabilizing structure; wherein, the flow-stabilizing structure includes:
    a box, used to provide a flow channel for the air entering the flow-stabilizing structure; and
    flow-stabilizing plates, inserted into cavities of the box in a layered manner;
    a wind source, arranged at an air inlet of the flow-stabilizing structure;
    a test device, arranged at an air outlet of the flow-stabilizing structure;
    wherein when the flow-stabilizing structure receives wind energy provided by the wind source, the flow state of the air is adjusted by flow stabilization, so that the testing device tests the air passing through the flow-stabilizing structure.

2. The PCB wind tunnel test equipment according to claim 1, further comprising:
    a PCB wind tunnel detachably arranged at the air outlet of the flow-stabilizing structure to fix PCBs of different specifications and sizes.

3. The PCB wind tunnel test equipment according to claim 2, wherein the size of an opening of the PCB wind tunnel is smaller than the size of the air outlet of the flow stabilizing structure.

4. The PCB wind tunnel test equipment according to claim 2, wherein the PCB wind tunnel is made of plastic or organic glass.

5. The PCB wind tunnel test equipment according to claim 2, wherein the test device includes:
    a temperature sensor and a wind speed sensor arranged between the air outlet of the flow-stabilizing structure and the PCB wind tunnel.

6. The PCB wind tunnel test equipment according to claim 5, wherein the wind source includes:
    a fan; and
    a pulse width modulation controller, electrically connected to the fan and used to adjust the rotation speed of the fan.

7. The PCB wind tunnel testing equipment according to claim 6, wherein the PCB wind tunnel testing equipment further comprises a processor connected to the pulse width modulation controller and the wind speed sensor, for testing air volumes passing through the PCB at different rotation speeds.

8. The PCB wind tunnel test equipment according to claim 1, wherein the flow-stabilizing plates include:
    a first layer of mesh plate configured to adjust the air flow from a spiral state to a turbulent state;
    a second layer of mesh plate arranged behind the first mesh plate and configured to adjust the air flow from the turbulent state to a flow-sharing state.

9. The PCB wind tunnel test equipment according to claim 8,
    wherein the distance between the first layer of mesh plate and the air inlet side of the box is between $\frac{1}{4}L$ and $\frac{1}{3}L$ and the distance between the second-layer mesh plate and the air outlet side of the box is between $\frac{1}{4}L$ and $\frac{1}{3}L$, wherein L is the length of box.

10. The PCB wind tunnel test equipment according to claim 8, wherein 30%~70% of the first layer of mesh plate and the second-layer mesh plate is occupied by holes.

11. The PCB wind tunnel test equipment according to claim 1, wherein the box is made of plastic or organic glass.

* * * * *